(12) United States Patent
Singh

(10) Patent No.: US 11,165,574 B2
(45) Date of Patent: Nov. 2, 2021

(54) SECURE MAP DATA STORAGE USING ENCODING BY ALGORITHM POOL

(71) Applicant: HERE Global B.V., Eindhoven (NL)

(72) Inventor: Rakesh Singh, Mumbai (IN)

(73) Assignee: HERE Global B.V., Eindhoven (NL)

( * ) Notice: Subject to any disclaimer, the term of this patent is extended or adjusted under 35 U.S.C. 154(b) by 147 days.

(21) Appl. No.: 16/163,774

(22) Filed: Oct. 18, 2018

(65) Prior Publication Data

US 2020/0127827 A1 Apr. 23, 2020

(51) Int. Cl.
*H04L 9/14* (2006.01)
*H04L 29/06* (2006.01)
*G06F 16/29* (2019.01)

(52) U.S. Cl.
CPC ............... *H04L 9/14* (2013.01); *G06F 16/29* (2019.01); *H04L 63/0435* (2013.01)

(58) Field of Classification Search
CPC ..... H04L 9/14; H04L 63/0435; H04L 9/0894; G06F 16/29
See application file for complete search history.

(56) References Cited

U.S. PATENT DOCUMENTS

| | | | |
|---|---|---|---|
| 8,700,890 B2 | 4/2014 | Runkis et al. | |
| 2002/0071438 A1* | 6/2002 | Singh | H04L 29/06027 370/398 |
| 2011/0191577 A1* | 8/2011 | Tian | H04L 9/00 713/150 |
| 2012/0158672 A1 | 6/2012 | Oltean et al. | |
| 2013/0334313 A1 | 12/2013 | Ganesan | |
| 2014/0098114 A1* | 4/2014 | Ju | H04N 19/156 345/520 |
| 2014/0101116 A1 | 4/2014 | Alnafoosi et al. | |
| 2014/0108462 A1* | 4/2014 | Pfeifle | G06F 16/9027 707/795 |
| 2016/0370193 A1* | 12/2016 | Maischberger | G01C 21/34 |
| 2017/0272100 A1 | 9/2017 | Yanovsky et al. | |
| 2019/0081782 A1* | 3/2019 | Dewitt | G06F 21/78 |

OTHER PUBLICATIONS

Prakash, G. L., Manish Prateek, and Inder Singh. "Data encryption and decryption algorithms using key rotations for data security in cloud system." Signal Propagation and Computer Technology (ICSPCT), 2014 International conference on. IEEE, 2014.

* cited by examiner

*Primary Examiner* — Meng Li
(74) *Attorney, Agent, or Firm* — Lempia Summerfield Katz LLC

(57) ABSTRACT

System and methods are provided for encoding map data. An algorithm pool is synced between a mapping server and a navigation device. The algorithm pool comprises a plurality of different algorithms. Map data is divided into a plurality of chunks of data. Each chunk of data of the plurality of chunks is encoded with a random algorithm from the algorithm pool. The encoded chunks are transmitted to the navigation device.

18 Claims, 7 Drawing Sheets

SECURE MAP DATA STORAGE USING ENCODING BY ALGORITHM POOL

FIELD

The following disclosure relates to navigation devices or services.

BACKGROUND

Modern vehicles require accurate navigational systems. A vehicle may eliminate many dangerous unknowns by identifying exactly where the vehicle is on the road in real time, along with its immediate surroundings. A high definition (HD) map may be a crucial component of assisted or automatic driving technology. Vehicles may include many sensors, but an HD map may be the most important tool vehicles use.

An HD map may be needed not only to allow a vehicle to precisely position itself laterally and longitudinally, but to enable the car to maneuver correctly. While sensors in vehicles may detect at a radius of approximately one hundred meters, a car traveling at eighty miles per hour may only have a sensing horizon of three seconds. Vehicles may need highly accurate and up to date maps to extend sensor range and "peek" around the corner.

Sensors in vehicles may be able to detect lanes and lane markings in real time using image processing and light detection and ranging (LIDAR) based systems. These systems are useful for obstacle avoidance and detecting the movements of other vehicles. When used alone though, on-board sensor systems may exhibit large blind spots and may be unable to predict events or maneuvers even a short distance away.

On-board sensors, however, when combined with HD maps may allow for assisted and highly automated vehicle operation. HD maps may allow a vehicle to identify precisely where it is with respect to the road (or the world) far beyond what the Global Positioning System (GPS) can do, and without inherent GPS errors. The HD map allows the vehicle to plan precisely where the vehicle may go, and to accurately execute the plan because the vehicle is following the map. By identifying precisely where a vehicle is on the road to the decimeter or even centimeter, and understanding the surroundings, a mapping platform may bring advanced safety to an ever-changing environment.

In order to function properly, an HD map should be updated at regular intervals to reflect changes to the roadway network. Permanent, semi-permanent, and temporary objects such as signage, lane changes, new roadways, and other features may be regularly added or removed from the roadway. This map data, for example, should be collected from different devices or vehicles traveling the roadway, validated, and then transmitted back out to the devices on the roadway in order to update HD maps and other applications.

The data collected by devices and transmitted back to devices may be sensitive data relating not only to the location and route of the vehicle but also potentially to a person or persons in the vehicle, or, for example, the contents of a vehicle, video, or images of the surroundings of the vehicle. The data, as such, should not be openly transmitted over a public or even private network without some form of encryption. Encryption and decryption (referred to together as cryptography) enable a device to store sensitive information or transmit it across insecure networks (e.g., the internet) so that the sensitive information cannot be read by anyone except the intended recipient. Data that can be read and understood without any special measures is called plaintext or cleartext. The method of disguising plaintext in such a way as to hide its substance is called encryption. Encrypting plaintext results in unreadable gibberish called ciphertext. Encryption is used to provide that information is hidden from anyone for whom it is not intended, even those who can see the encrypted data. The process of reverting ciphertext to its original plaintext is called decryption.

A cryptographic algorithm, or cipher, is a mathematical function used in the encryption and decryption process. Each cryptographic algorithm works in combination with a key—a word, number, or phrase—to encrypt the plaintext. The same plaintext encrypts to different ciphertext with different keys. Conventional encryption has benefits, for example, it is very fast. In addition, it is especially useful for encrypting data that is not going anywhere. However, conventional encryption used for transmitting secure data can be quite expensive and complicated due to the difficulty of secure key distribution.

The challenge of securing the data is critical. Using a key based cryptographic scheme may introduce unwanted complexity and complications into the process. In addition, the encryption needs to be fast, robust, and secure.

SUMMARY

In an embodiment, a method is provided for encoding map data. A processor syncs an algorithm pool between a mapping server and a navigation device. The algorithm pool comprises a plurality of different algorithms. The processor divides the map data into a plurality of chunks of data. The processor encodes each chunk of data of the plurality of chunks with a random algorithm from the algorithm pool. The encoded chunks are transmitted to the navigation device.

In an embodiment, a method is provided for encoding map data. A navigation device determines a location of the navigation device. The navigation device syncs an algorithm pool with a mapping server. The algorithm pool comprises a plurality of different algorithms. The navigation device collects map data. The navigation device divides the map data into a plurality of chunks of data. The navigation device encodes each chunk of data of the plurality of chunks with a random algorithm from the algorithm pool. The navigation device transmits the encoded map data to the mapping server.

In an embodiment, a system is provided for securing map data by a navigation device. The system includes a sensor, a memory, and a processor. The sensor is configured to collect map data. The memory is configured to store an algorithm pool comprising a plurality of different algorithms. The processor is configured to divide the map data into a plurality of chunks and encode each chunk of the plurality of chunks using a random algorithm from the algorithm pool.

BRIEF DESCRIPTION OF THE DRAWINGS

Exemplary embodiments of the present invention are described herein with reference to the following drawings.

DETAILED DESCRIPTION

Figure 1:
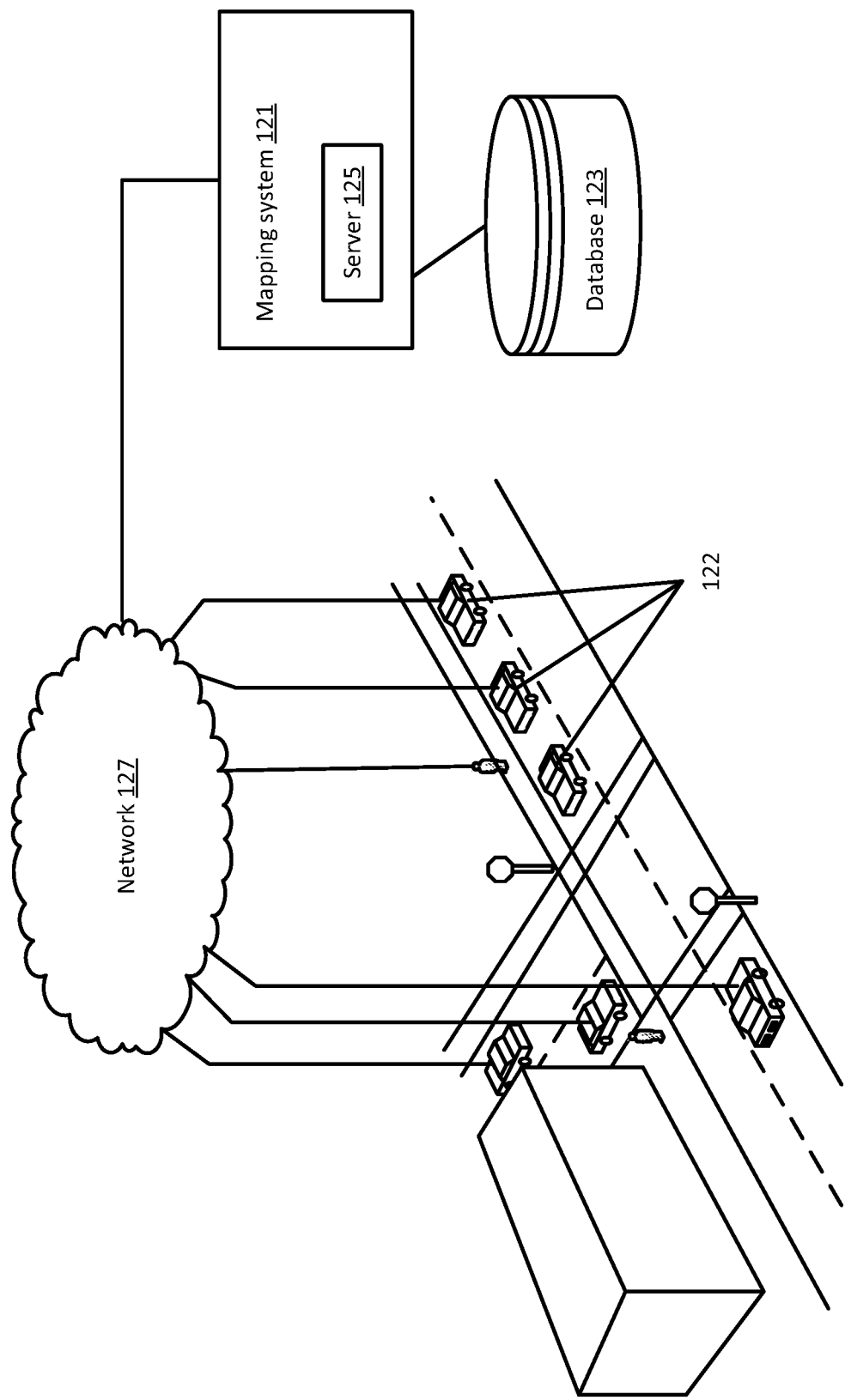
FIG. 1 depicts an example system for encoding and transmitting map data.

Embodiments described herein provide systems and methods for encoding map data using a non-cryptography technique so that management of a key is not required. An algorithm pool is generated and synced between a mapping system and navigation device. The algorithm pool contains a number of distinct algorithms. Map data that is to be communicated between the mapping system and the navigation device is broken up into 'N' chunks depending on the size of data. A randomly 'M' number of algorithm are selected from the algorithm pool. Each chunk is then encoded with a randomly selected algorithm from the algorithm pool, and transmitted.

Map data may be sensitive data that requires special attention when being used or shared. One form of map data is location data. Location data is any data with an implicit or explicit geographic or geospatial reference, including any data derived from a global positioning system (GPS), a geographic information system (GIS), cell-tower or other radio signal based triangulation, assisted-GPS positioning devices, systems and processes, geo-tagged images, video, audio and text documents, satellite and aerial imagery, computerized, digitized and paper maps, IP address location, public documents, public or private databases, video, audio, text and image files, location-based applications. Location data is any form of information that has a geographic position associated with it.

Location data is among the most sensitive data currently being collected. In order to benefit fully from location based services such as mapping or navigation services, user have to share their location data. The location data may be used to both identify prior locations, current locations, or future locations of a person or device. For example, the future location of a person may be predicted based on historical location patterns. Additionally, other types of information may be derived from locational data. Because a lot can be inferred by knowing someone's location, location data can serve as the connection between disparate pieces of information to build a more complete "picture" about a person or event. A list of potentially sensitive professional and personal information may be inferred about an individual knowing only the user's location data. These include, for example, the movements of a competitor sales force, attendance of a particular church or an individual's presence in a motel, or at an abortion clinic. For example, as little as four spatial-temporal points, e.g., approximate places and times, are enough to uniquely identify 95% of people in a mobility database.

Other types of map data that may be used by a mapping service or navigation application may also be sensitive. For an HD map, image data, video, LIDAR, or RADAR data may be collected to identify the surroundings of a vehicle. These types of data may also depict other people in the area or buildings. For example, collect images of video may show people leaving strip clubs, protesters at an abortion clinic, sunbathers in bikinis, cottagers at public parks, people picking up prostitutes and people engaging in activities visible from public property which they do not wish to be photographed and have published online. In addition, there may be laws or restrictions prohibiting the filming without consent of an individual on public property for the purpose of public display.

In an embodiment, systems and methods provide an application with an algorithm pool, that allows for data to be stored safety and securely to a remote location. Map data is divided into different chunks depending on the size of the map data. Each chunk is encoded with a random algorithm from the algorithm pool which will be defined as number or an identifier. As a result, the map data is totally jumbled in such a way that the same word will be different on different chunk of data as different algorithm is been used. To decode the data, the number of the chunk is identified. Each chunk has the number or identifier for the application through which the data is encoded.

FIG. 1 depicts a system for encoding and transmitting map data. The system includes one or more devices 122, a network 127, and a mapping system 121. The mapping system 121 may include or may be connected to a database 123 (also referred to as a geographic database or map database). The mapping system 121 may include one or more servers 125. Additional, different, or fewer components may be included.

In order to update the HD map and provide mapping services, a mapping system 121 may collect and make use of information about a user's actual location ("Location Data") and information about places ("Place Information"). Location data reveals where the user currently is or where the user has been. Location data is based on available positioning methods, such as assisted GPS. A navigation device 122 may transmit location data to the mapping system 121 when location enabled features are used. Location data may be collected when a user or device uses a navigation or mapping feature. Location data, speed, direction and a timestamp may be collected and sent from a device to a mapping system 121 or service to detect traffic jams, traffic patterns, changed road conditions and other such conditions. This information may be analyzed to distinguish independent routes and traffic patterns and contains an identifier, which is persistent for the duration of the route.

The system includes one or more devices 122. The one or more devices may include probe devices, probe sensors, or other devices 122 such as personal navigation devices 122 or connected vehicles. The mapping system 121 may communicate with the devices 122 through the network 127. The mapping system 121 may also receive data from one or more systems or services that may be used to identify the location of a vehicle or roadway conditions. The device 122 may be a navigation system or service built into the vehicle and configured to monitor the vehicle. The devices 122 may also be integrated in or with a vehicle. The devices 122 may include mobile phones running specialized applications that collect location data as the devices 122 are carried by persons or things traveling the roadway system. The devices 122 may be configured to collect and transmit data including location data, personal data, vehicular data, or data relating to the surroundings of the device 122. The devices 122 may be configured to provide guidance for a user or vehicle.

The device 122 may be integrated into an autonomous vehicle or a highly-assisted or highly-automated driving (HAD) vehicle. The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. Autonomous vehicles may park themselves or move cargo between locations without a human operator. Autonomous vehicles may include multiple modes and transition between the modes. The autonomous vehicle may steer, brake, or accelerate the vehicle based on the position of the vehicle in order to avoid or comply with a routing or driving instruction from the device 122 or mapping system 121.

The device 122 may be configured as a navigation system for an autonomous vehicle or a HAD. Any of these assisted driving systems may be incorporated into the device 122. Alternatively, an assisted driving device may be included in the vehicle. The assisted driving device may include memory, a processor, and systems to communicate with the mobile device 122. The assisted driving vehicles may response to geographic data received from geographic database 123 and the server 125. An autonomous vehicle or HAD may take route instructions based on a road segment and node information provided to the navigation device 122.

A HAD vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the position of the vehicle and routing instructions.

ADAS vehicles include one or more partially automated systems in which the vehicle alerts the driver. The features may be used to provide alerts to the operator regarding upcoming features. ADAS vehicles may include adaptive cruise control, automated braking, or steering adjustments to keep the driver in the correct lane. ADAS vehicles may issue warnings for the driver based on the position of the vehicle either on a roadway or within a road network system.

The device 122 may be configured to collect or acquire map data using one or more sensors or observations. The device 122 may be configured to encode the map data using an algorithm pool. The device 122 may be configured to transmit the encoded map data to an external location for storage or use. The device 122 may be configured to receive encoded data and decode the data using an algorithm pool. The device 122 may be configured to sync algorithm pools with other devices 122 or mapping systems 121.

The mapping system 121 and devices 122 are connected to the network 127. The devices 122 may receive or transmit data through the network 127. The mapping system 121 may receive or transmit data through the network 127. The mapping system 121 may also transmit paths, routes, or feature data through the network 127. The network 127 may include wired networks, wireless networks, or combinations thereof. The wireless network may be a cellular telephone network, LTE (Long-Term Evolution), 4G LTE, a wireless local area network, such as an 802.11, 802.16, 802.20, WiMax (Worldwide Interoperability for Microwave Access) network, DSRC (otherwise known as WAVE, ITS-G5, or 802.11p and future generations thereof), a 5G wireless network, or wireless short-range network. Further, the network 127 may be a public network, such as the Internet, a private network, such as an intranet, or combinations thereof, and may utilize a variety of networking protocols now available or later developed including, but not limited to transmission control protocol/internet protocol (TCP/IP) based networking protocols.

The mapping system 121 may include multiple servers 125, workstations, databases, and other machines connected together and maintained by a map developer. The mapping system 121 may be configured to receive probe reports from the device 122 that include map data. The mapping system 121 may be configured to receive encoded map data from devices 122 and decode the map data using an algorithm pool. The mapping system 121 may be configured to encode map data using an algorithm pool and transmit the encoded map data to one or more devices 122. The mapping system 121 may be configured to sync algorithm pools with one or more devices.

The mapping system 121 may also be configured to generate routes or paths between two points (nodes) on a stored map. The mapping system 121 may be configured to provide up to date information and maps to external geographic databases 123 or mapping applications. The mapping system 121 may be configured to encode or decode map or geographic data.

The mapping system 121 may include one or more server(s) 125. A server 125 may be a host for a website or web service such as a mapping service and/or a navigation service. The mapping service may provide maps generated from the geographic data of the database 123, and the navigation service may generate routing or other directions from the geographic data of the database 123. The mapping service may also provide information generated from attribute data included in the database 123. The server 125 may also provide historical, future, recent or current traffic conditions for the road segments, segments, paths, or routes using historical, recent, or real time collected data.

Figure 2:
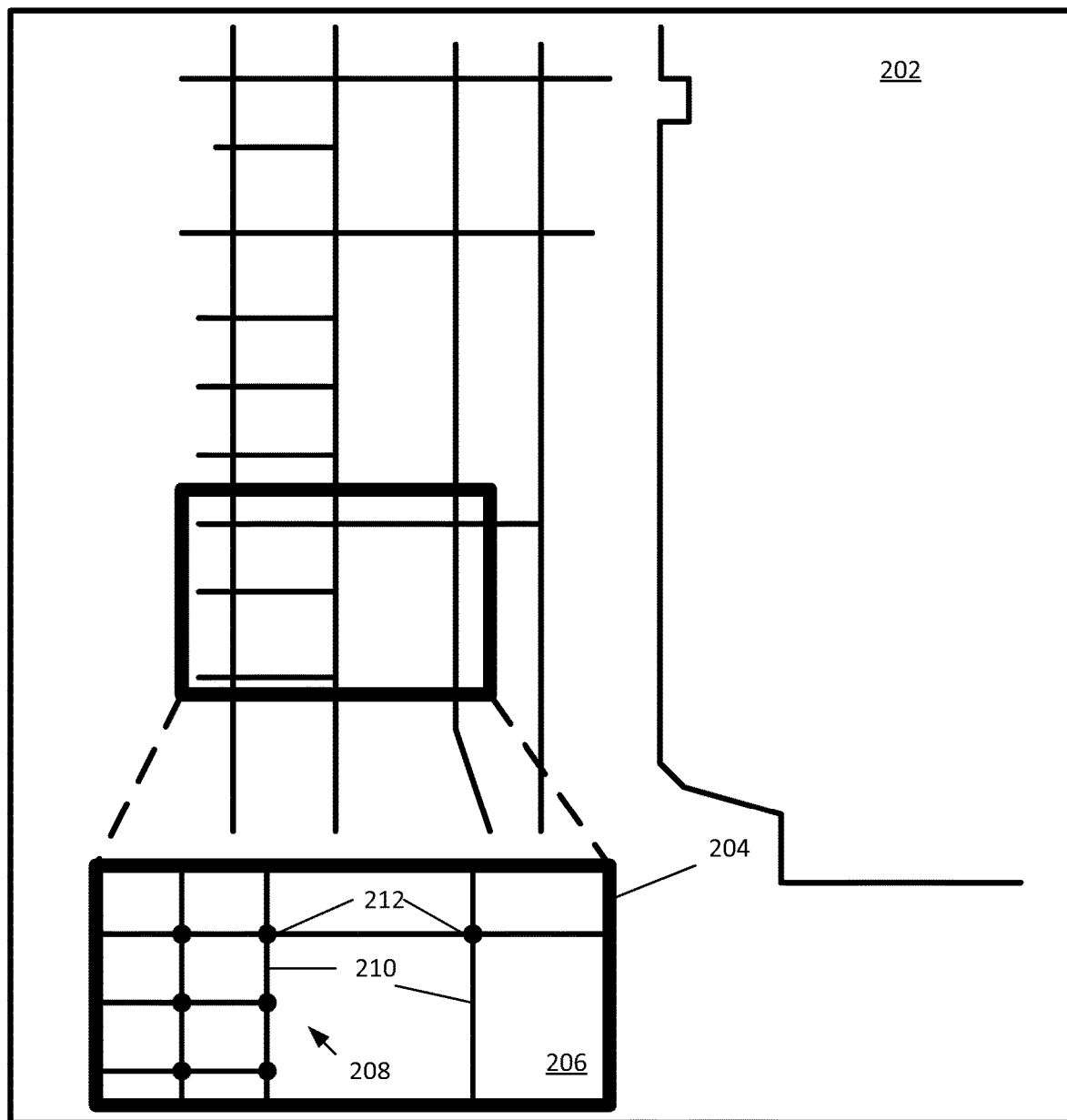
FIG. 2 depicts an example map of a geographic region.

The mapping system 121 includes the geographic database 123. In order to provide navigation related features and functions to the end user, the mapping system 121 accesses the geographic database 123. The geographic database 123 includes information about one or more geographic regions. FIG. 2 illustrates a map of a geographic region 202. The geographic region 202 may correspond to a metropolitan or rural area, a state, a country, or combinations thereof, or any other area. Located in the geographic region 202 are physical geographic features, such as roads, points of interest (including businesses, municipal facilities, etc.), lakes, rivers, railroads, municipalities, etc.

FIG. 2 further depicts an enlarged map 204 of a portion 206 of the geographic region 202. The enlarged map 204 illustrates part of a road network 208 in the geographic region 202. The road network 208 includes, among other things, roads and intersections located in the geographic region 202. As shown in the portion 206, each road in the geographic region 202 is composed of one or more road segments 210. A road segment 210 represents a portion of the road. Road segments 210 may also be referred to as links. Each road segment 210 is shown to have associated with it two nodes 212; one node represents the point at one end of the road segment and the other node represents the point at the other end of the road segment. The node 212 at either end of a road segment 210 may correspond to a location at which the road meets another road, i.e., an intersection, or where the road dead ends.

The geographic database 123 contains geographic data that represents some of the geographic features in the geographic region 202 depicted in FIG. 2. The data contained in the geographic database 123 may include data that represent the road network 208. The geographic database 123 that represents the geographic region 202 may contain at least one road segment database record (also referred to as "entity" or "entry") for each road segment 210 in the geographic region 202. The geographic database 123 that represents the geographic region 202 may also include a node database record (or "entity" or "entry") for each node 212 in the geographic region 202. The terms "nodes" and "segments" represent only one terminology for describing these physical geographic features, and other terminology for describing these features is intended to be encompassed within the scope of these concepts.

The geographic database 123 may include feature data. The feature data may represent types of geographic features.

|     | Decimal |      |      |      |      |      |      |      |      |      |
|-----|---------|------|------|------|------|------|------|------|------|------|
|     | 0       | 1    | 2    | 3    | 4    | 5    | 6    | 7    | 8    | 9    |
| BCD | 0000    | 0001 | 0010 | 0011 | 0100 | 0101 | 0110 | 0111 | 1000 | 1001 |

The other kinds of feature data may include point of interest data or other roadway features. The point of interest data may include point of interest records comprising a type (e.g., the type of point of interest, such as restaurant, fuel station, hotel, city hall, police station, historical marker, ATM, golf course, truck stop, vehicle chain-up stations etc.), location of the point of interest, a phone number, hours of operation, etc. The feature data may also include painted signs on the road, traffic signal, physical and painted features like dividers, lane divider markings, road edges, center of intersection, stop bars, overpasses, overhead bridges etc.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout the geographic region to observe features and/or record information about the roadway. Actual observed feature data may be referred to as ground truth data. Remote sensing, such as aerial or satellite photography, may be used. The database 123 is connected to the server 125.

The geographic database 123 and the data stored within the geographic database 123 may be licensed or delivered on-demand. Other navigational services or traffic server providers may access the traffic data and the feature data stored in the geographic database 123. Data including feature data may be broadcast as a service.

Figure 3:
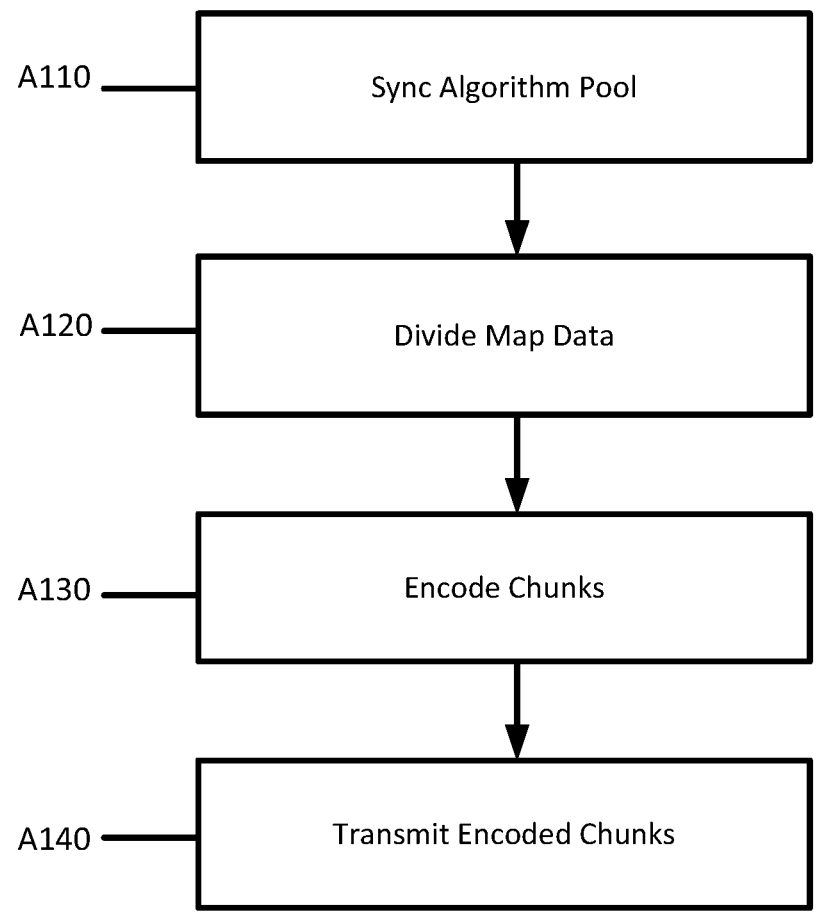
FIG. 3 depicts an example method for encoding and transmitting map data.

FIG. 3 illustrates an example flow chart for encoding and transmitting map data. As presented in the following sections, the acts may be performed using any combination of the components indicated in FIG. 1, FIG. 5, or FIG. 7. The following acts may be performed by the server 125, the device 122, the mapping system 121, or a combination thereof. Additional, different, or fewer acts may be provided. The acts are performed in the order shown or other orders. Acts A110 and A120 may be performed in the order as described or in reverse. The data may be divided and then the algorithm pool synced. The acts may also be repeated. Certain acts may be skipped.

At act A110, an algorithm pool is synced with a navigation device 122. The algorithm pool is a collection of possible algorithms that are used for encoding and decoding the map data. The size of the algorithm pool may range from a few different algorithms to several hundred or possibly thousands of algorithms. Each of the algorithms may be distinct from one another. Each algorithm applied to the same set of data generates a different encrypted text. Example algorithms may include ASCII, Unicode, URL Encoding, Base64, Polyalphabetic Substitution Ciphers, Morse code, the Baudot code, among others.

Baudot uses a series of bits to represent characters that could be sent over a telegraph wire or radio signal. Characters are given a 5 bit code such as 00010 which is limited to 32 different combinations.

BCD uses a series of 4 bits called a nibble to represent a decimal number, as the following table demonstrates:

For example, the number 1456 would be represented by 0001 0100 0101 0110.

ASCII is based on 7 bits to represent English characters. ASCII supports 95 printable characters and 33 control characters. ASCII is the Americanized version of that defined by CCITT in ISO 646 and is known as the International Alphabet 5 (IA5). The first 32 characters are control characters and are represented by the 7-bit codes 000 0000 (null character) through to 001 1111 (unit separator). The 128th control character is 'delete' represented by 111 1111. The rest of the characters are printable and the coding caters for both lower and uppercase English letters e.g., the letter 'd' is represented by 110 0100 whereas its upper-case equivalent is represented by 100 0100.

Extended Binary Coded Decimal Interchange Code (EBCDIC) is an 8-bit coding system designed to replace BCD. An EBCDIC byte is divided in two nibbles. The first four bits is called the zone and this represents the category of the character, the last four bits is called the digit and this identifies the specific character. Unicode provides for the traditional character sets around the world to take part in multilingual computer processing amongst themselves rather than have to translate into a Roman character set first.

Unicode creates codes for the characters or basic graphical representation of the character (called a 'grapheme'). The first 256 code points have been reserved for ISO 5589-1 in order to make it straightforward to convert the Roman text. There are two Unicode mapping methods; Unicode Transformation Format (UTF) and Unicode Character Set (UCS). An encoding maps the range of Unicode code points to sequences of values in a fixed-size range of code values. The numbers in the names of the encodings indicate the number of bits in one code value (for UTF encodings) or the number of bytes per code value (for UCS) encodings. UCS assigns a code per character. UCS-2 uses two bytes per character, UCS-4 uses 4 bytes per character. Different Unicode standards may be used such as UTF-7—a 7-bit encoding, UTF-8—an 8-bit, UTF-EBCDIC—an 8-bit variable-width encoding, UTF-16—a 16-bit, variable-width encoding or UTF-32—a 32-bit, fixed-width encoding. Any encoding algorithm may be used in the algorithm pool. Other more complex encoding or encryption algorithms may also be used such as Blowfish, AED, Twofish, MD5, SHA 1, HMAC or RSA.

The algorithm pool may be generated by the mapping system 121 or the navigation device 122 (depending on which side is initiating the communications). In an embodiment, an application that syncs, encrypts, and transmits the map data is interchangeable on both sides and agnostic to whether the application is on the mapping system 121 or navigation device 122. For generating the algorithm pool, the application selects a subset of algorithms to be used for encoding. Additionally, each selected algorithm is assigned an identifier.

To sync the algorithm pool, the mapping system 121 communicates the algorithms to the navigation device 122. The entire pool of algorithms may be communicated or only a portion of the pool of algorithms, for example, if the mapping system 121 and navigation device 122 had previously synced algorithms. In an embodiment, if the algorithm pool has been previously synced (and remains consistent), the mapping system 121 may only transmit new or different identifiers for the algorithms. In an embodiment, the syncing may only occur over a secure network or when directly connected. Syncing may also occur between multiple devices. For example, the mapping system 121 may sync an algorithm pool with multiple devices for a multicast. The mapping system 121 may sync an algorithm pool with a device which then syncs the pool with another device and so on.

In an embodiment, the algorithms are stored at the mapping system 121. In an embodiment, the algorithm pool may be stored at a remote location (in that case the identifier would be unique) and as per the need the vehicle/device or server may access and use the algorithm pool. Remote storage may be used, for example, for vehicle to vehicle communication when neither vehicle maintains a full set of algorithms or an algorithm pool. In an embodiment, the algorithms are stored on both the navigation device 122 and the mapping system 121.

The algorithms may be defined by different attributes. The algorithms may be classified as including the attributes. For example, certain algorithms may be classified as low bandwidth, low computational complexity, high security, low security, speed, etc. The algorithms may be classified prior to the steps in this method. A performance benchmark, for example, found at http://java-performance.info/base64-encoding-and-decoding-performance/. A benchmarking application benchmarks each algorithm for bandwidth used, computation statistics, and security among other attributes. The benchmarks for the algorithms are compared against one another to define a ranking or benchmark score. Other benchmarking applications may be used to compare and classify the algorithms. The algorithm pool may include only certain types of algorithms based on the classifications. In an example, there may be one hundred different possible algorithms. A first quantity (e.g., thirty) of the algorithms may be classified with an attribute of low bandwidth. A second quantity (e.g., forty) may be classified with an attribute of low complexity. An overlapping quantity (e.g., twenty) may be classified with attributes of both low bandwidth and low complexity. In a scenario that requires both low bandwidth and low complexity, the algorithm pool may include algorithms selected from the algorithms that including both low bandwidth and low complexity attributes.

The selection of algorithm in the algorithm pool may be based on location. For example, one location may require low security, another high security. One location may have low transmission bandwidth limits, another may be unlimited. Different regions or countries may have different requirements for transmitting personal information. The selection of algorithms may be based on the type of data being transmitted. Certain data may have higher security requirements than other data. Users may also have different preferences regarding security versus speed and computational requirements. The selection of algorithms provides that the system may dynamically adjust the encoding so that the levels of security, bandwidth, and computational complexity are configured for the scenario at hand. The algorithm pool (e.g., algorithms in the algorithm pool) may be selected from a plurality of predefined algorithm pools as a function of an attribute of the navigation device. The device 122 may be previously classified as requiring one or more attributes of the algorithms. For example, a device 122 may be older and slow and as such may require low computational classified algorithms. A device 122 may include low bandwidth capabilities (due to a data plan or location, for example) and as such may require low bandwidth classified algorithms. A device may be classified using a benchmarking application as described above or a user may be prompted to select one or more attributes of the device.

In an embodiment, the number of different algorithms may be increased by using different parameters for an algorithm. As an example, a first algorithm 1.0 may include multiple variations such as 1.1, 1.2, 1.3, etc. where 1.1, 1.2, and 1.3 retain the same structure as the first algorithm 1.0 but may use a different variable or parameter so that they encrypt the data differently.

At act A120, the map data is divided into chunks of data. The size of chunks may be determined based on the total size of the data and the number of algorithms in the algorithm pool. The number of chunks may correspond to the number of algorithms in the algorithm pool or may differ. For example, each chunk may be encoded with a different algorithm. Alternatively, the algorithms may be reused (at random) for different chunks if there are more chunks than algorithms in the algorithm pool.

The number (and therefore size) of the chunks may be determined as a function of other parameters such as bandwidth, speed, computational requirements, etc. From the given data, each chunk can utilize different algorithm to encode it and same logic (algorithm) would be used to decode it back. The size of the chunks may depend on the type of data or size of data. For certain types of data, there may be straightforward breaking points in the data (e.g., it may be easily divided). For example, for video data, each frame may be considered a chunk. For an image, the image may be split into X number of pixels. For a description or natural language, the division may be after a certain number of letters or words or paragraphs. Alternatively, each chunk may contain the same or similar number of bits or bytes. In an embodiment, the chunks are generated at random points in the map data. One chunk may be larger than another.

At act A130, each of the chunks is encoded using a random algorithm from the algorithm pool. The chunks are also encoded with a number or id, e.g., algorithm identifier, that specifies the algorithm used to encode the chunk. For example, each chunk may include a header that is appended onto the encoded data that specifies the identifier of the algorithm that is used to encode the data. The identifiers are synced between the device and the mapping system 121 at act A110. No other device or application would be able to identify the algorithm by the identifier.

Figure 4:
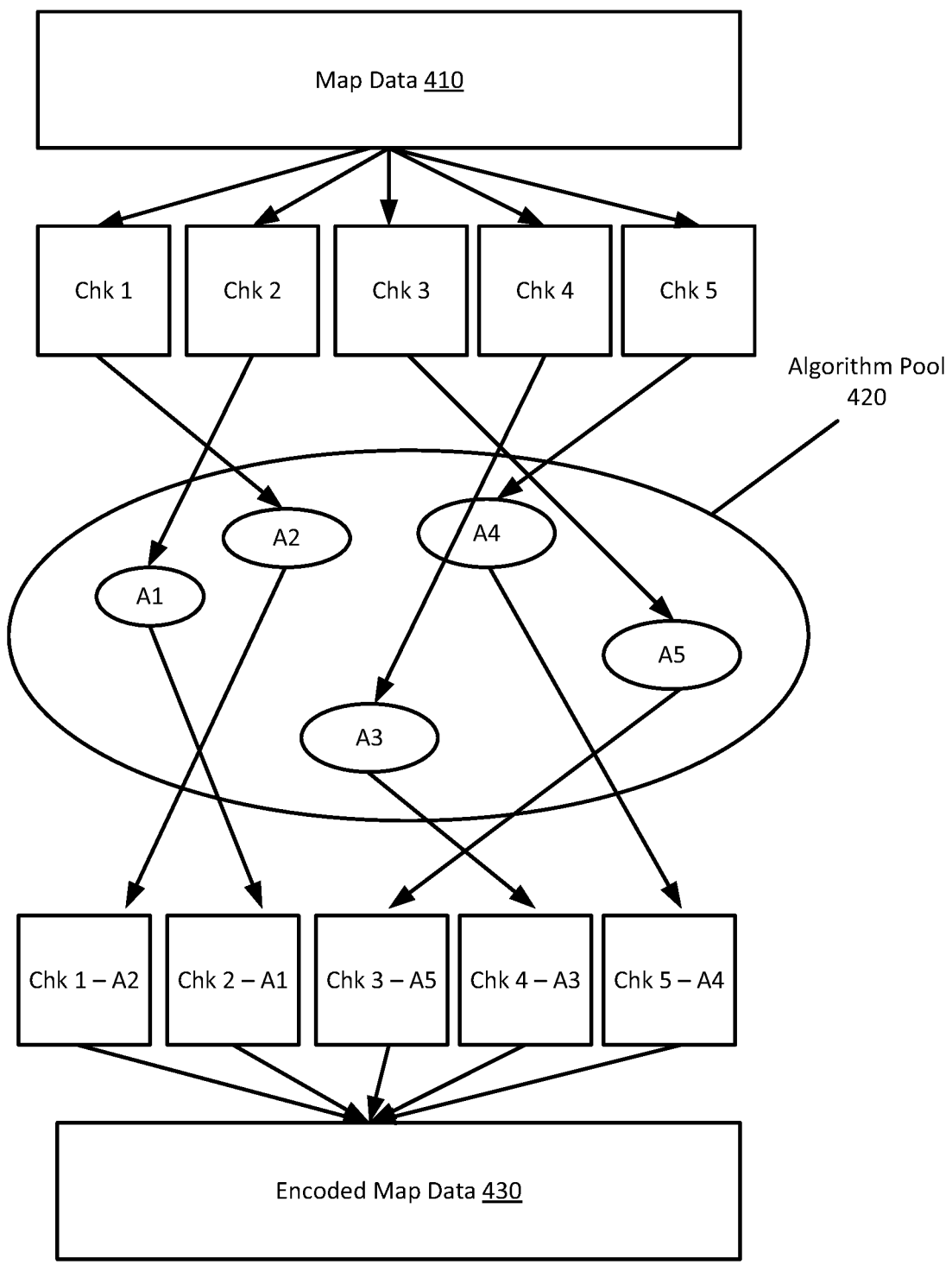
FIG. 4 depicts an example diagram of encoding map data.

FIG. 4 depicts a diagram for encoding the map data 410. The map data 410 is divided into chunks (Chk 1-5). The chunks are encoded using an algorithm (A1-A5) in the algorithm pool 420. The encoded chunks (Chk1-A2; Chk2-A1; Chk3-A5; Chk4-A3; Chk5-A4) include the identifier for the algorithm that is used to encode the chunk. The encoded map data 410 may then be securely stored locally or transmitted remotely. The algorithms may be chosen at random when applied to the chunks. For example, as depicted, Chk1 is encoded by Algorithm A2. However, if encoded again, Chk1 may be encoded by a different algorithm as the selection is random. A protection mechanism may be applied to prevent the same algorithm being applied to two consecutive chunks of data.

In an example for encoding using two different algorithms, each algorithm converts vowels to different characters. The first algorithm converts: A→w; E→A; I→*; O→h; U→2. The second algorithm converts A→r; E→&; I→4; O→7; U→_.

For this example, the paragraphs in a description may define the chunks. E.g. a first paragraph is the first chunk, the second paragraph is the second chunk and so on. So, for the paragraph having a word 'Rakesh', when encoded with the first algorithm, the word will be changed to 'Rwk^sh'. For a paragraph encoded with the second algorithm, then 'Rakesh'→'Rrk&sh'.

In an embodiment, the number of chunks may correspond to the number of algorithms in the algorithm pool. Each chunk may therefore be assigned a unique algorithm. Alternatively, the same algorithm may be used for multiple chunks.

At act A140, the encoded map data 430 is transmitted to the navigation device 122. The data may be transmitted over any type of network as the data is encoded and cannot be accessed by other parties. In an example, the data may be stored in the cloud for later access by the navigation device 122. The data may be transmitted to a location that is closer to the navigation device 122 so that the navigation device 122 can quickly access the data as necessary. In an example, one vehicle may server as a local datastore for multiple vehicles located around the vehicle. The vehicle may have a quick connection to the mapping system 121. The mapping system 121 is then able to push data to the vehicle for other vehicles that may not have a quick connection to the mapping system 121. The data is secure, however, because only a vehicle that has a synced algorithm pool is able to access the data. Each vehicle may be synced differently providing that only a specific vehicle may be able to access the specific data.

After accessing the map data 410, the navigation device 122 may decode the data using the synced algorithm pool. When the encoded data is accessed, the number of chunks is identified. Each chunk has the number or identifier (algorithm identifier) for the application through which the data is encoded. The navigation device 122 uses the algorithm to decode the data. The data may then be used by the navigation device 122, for example in a navigation application or mapping application. Alternatively, in the scenario where the navigation device 122 is transmitting data to the mapping system 121, the mapping system 121 may decode the encoded map data 430 and use the data to update a map database, for example, by adding or changing a feature. The decoded map data may be used to generate routes for one or more vehicles on the roadway. For example, if the navigation device 122 is sending traffic flow data, the mapping system 121 may decode the data, update the map database, encode the updates, and transmit the updates out to devices on the roadway.

The device 122 may be configured to execute routing algorithms using a geographic database 123 to determine a route to travel along a road network from a starting location to a destination location in a geographic region. Using input from an end user, the device 122 examines potential routes between the origin location and the destination location to determine the optimum route in light of user preferences. The device 122 may then provide the end user with information about the route in the form of guidance that identifies the maneuvers required to be taken by the end user to travel from the origin to the destination location. Some devices 122 show detailed maps on displays outlining the route, the types of maneuvers to be taken at various locations along the route, locations of certain types of features, and so on. The device 122 may receive data from the geographic database 123 through the communications interface 205.

Figure 5:
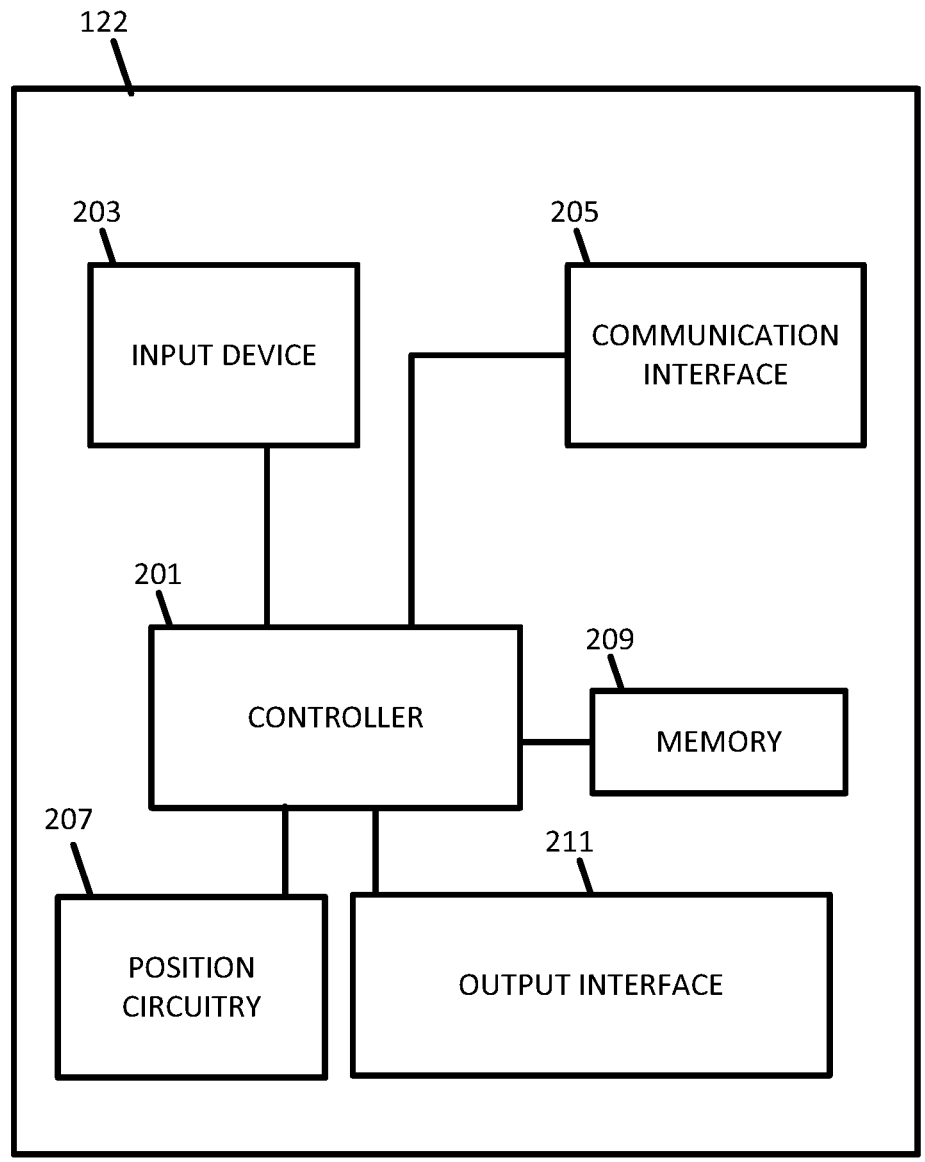
FIG. 5 depicts an example device for encoding and transmitting map data.

FIG. 5 illustrates an example device 122 of the system of FIG. 1 that may be configured to receive and transmit map data. The device 122 may be configured to collect, transmit, receive, process, or display data. The device 122 may also be referred to as a probe 122, a mobile device 122 or a navigation device 122. The device 122 includes a controller 201, a memory 209, an input device 203, a communication interface 205, position circuitry 207, and an output interface 211. Additional, different, or fewer components are possible for the mobile device 122. The device 122 may be smart phone, a mobile phone, a personal digital assistant (PDA), a tablet computer, a notebook computer, a personal navigation device (PND), a portable navigation device, and/or any other known or later developed mobile device. In an embodiment, a vehicle may be considered a device 122, or the device 122 may be integrated into a vehicle. The device 122 may receive or collect data from one or more sensors in or on the vehicle.

Figure 6:
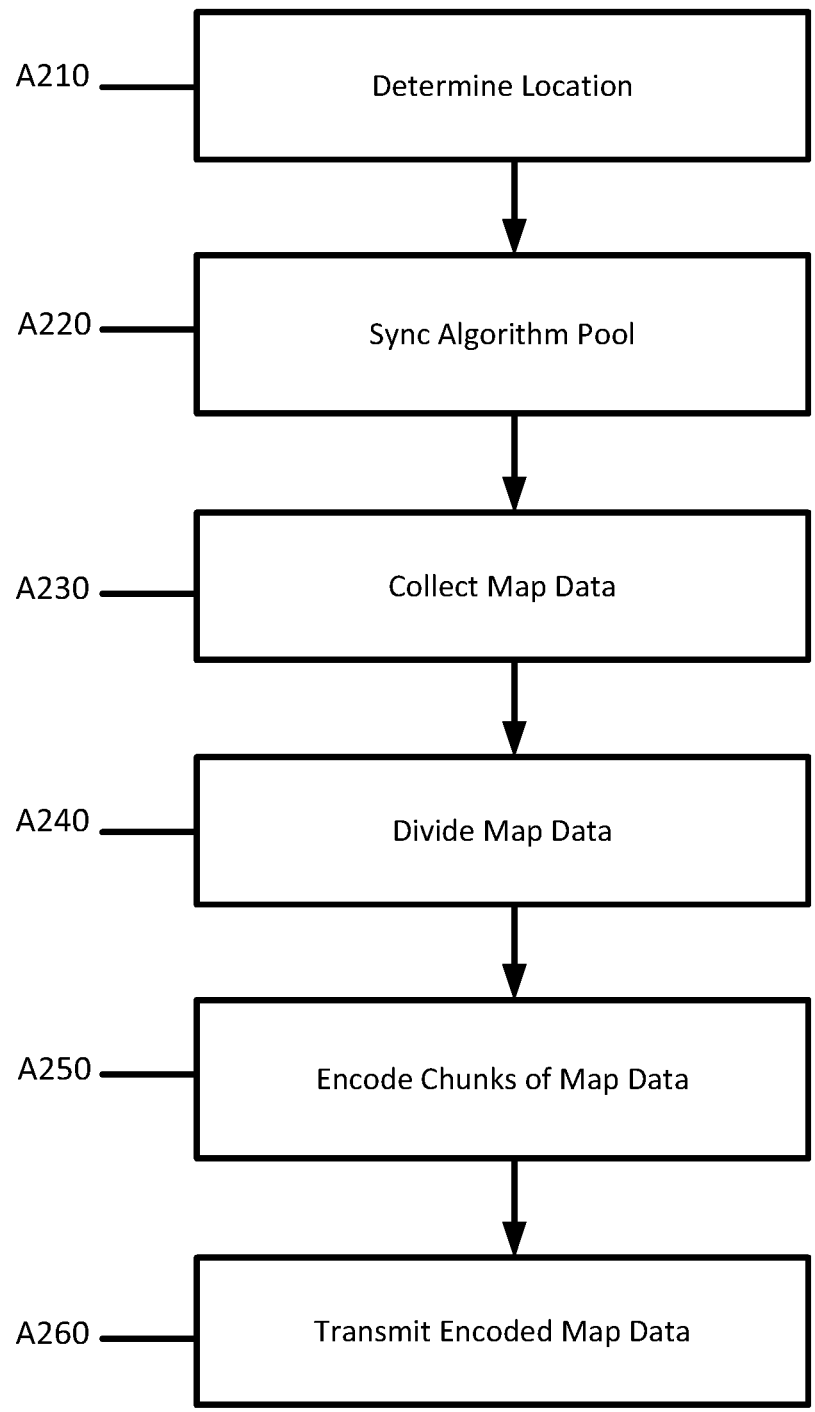
FIG. 6 depicts an example method for collecting and encoding map data.

FIG. 6 depicts an example method for collecting and transmitting encoded data to a mapping system 121 from a navigation device 122. As presented in the following sections, the acts may be performed using any combination of the components indicated in FIG. 1, FIG. 5, or FIG. 7. The following acts may be performed by the server 125, the device 122, the mapping system 121, or a combination thereof. Additional, different, or fewer acts may be provided. The acts are performed in the order shown or other orders. Acts A220 and A230 may be performed in the order as described or in reverse. The data may be collected prior to the algorithm pool being synced. The acts may also be repeated. Certain acts may be skipped.

At act A210, a location is determined by the navigation device 122. The location may be identified by using positional data. The positional data may be collected at the device 122 by use of GPS receivers or Global Navigation Satellite System (GNSS) receivers. Positional data may also be collected from positional sensors in the device 122 or imbedded in the vehicle. Positional data may be derived from other data such as WIFI, lidar, or cellular signals. Positional data may be collected at regular intervals. Positional data may also be collected at a change in heading of the vehicle or device 122. Positional data may be supplemented with additional sensor data such as wireless or radar sensors in order to more accurately identify the position of the vehicle. The location of the navigation device 122 may be derived from the positional data. The current location of the device 122 (and as such, vehicle) may be identified using positional circuitry 207 such as GPS or other positional inputs. The positioning circuitry 207, which is an example of a positioning system, is configured to determine a geographic position of the device 122. The positioning circuitry 207 may include movement circuitry, which is an example a movement tracking system, is configured to determine movement of a device 122. The position circuitry 207 and the movement circuitry may be separate systems, or segments of the same positioning or movement circuitry system. In an embodiment, components as described herein with respect to the navigation device 122 may be implemented as a static device. For example, such a device 122 may not include positional circuitry 207 but may involve a speed or velocity detecting input device. The device 122 may identify its position as the device 122 travels along a route using the positional circuitry. For indoor spaces without GPS signals, the navigation device 122 may rely on other geolocation methods such as LIDAR, radar, Wi-Fi, beacons, landmark identification, inertial navigation (dead reckoning), among others.

Positional data and/or a location may be input manually into the device. The input device 203 may be one or more buttons, keypad, keyboard, mouse, stylist pen, trackball, rocker switch, touch pad, voice recognition circuit, or other device or component for inputting data to the device 122. The input device 203 and the output interface 211 may be combined as a touch screen, that may be capacitive or resistive. The output interface 211 may be a liquid crystal display (LCD) panel, light emitting diode (LED) screen, thin film transistor screen, or another type of display. The output interface 211 may also include audio capabilities, or speakers.

At act A220, an algorithm pool is synced with a mapping system 121 using the location. The device 122 may store all of the algorithms in the algorithm pool, or the algorithms may be transmitted from the mapping system 121 or a remote location. In an embodiment, there is a common application that manages the algorithm pool for multiple devices or workstations. In an example, a device, for example a smartphone or desktop, may use the algorithm pool to share data with other devices/workstations that are authorized to use the common application. Data is encoded using the common application, which is present on all the devices in the zone. Each device is then able to access without having to remember a key between any authorized devices in that zone. Devices that are outside, e.g., not authorized, may not access the data. A zone may be defined by a list of authorized devices, for example, all devices in an office or that belong to a company. Other zones may be larger and include, for example, all vehicles in a fleet. All trucks that belong to a particular trucking company may belong to the same zone and as such use the same algorithm pool and as such maintain secure communications without having to share a key.

The algorithm pool includes two or more different algorithms. Example algorithms may include ASCII, Unicode, URL Encoding, Base64, Polyalphabetic Substitution Ciphers, Morse code, the Baudot code, among others. In an embodiment, the algorithms in the algorithm pool are selected by the mapping system 121 to include one or more attributes. For example, the algorithms may be classified as low bandwidth, low computational requirements, high security, low security, etc. The classification of the algorithms may be done prior to this method. The attributes of the algorithms may be assigned using, for example, a benchmarking application.

In an embodiment, the algorithms in the algorithm pool are selected and synced as a function of the location of the device identified at act A210. Different locations may indicate different attributes for algorithms in the algorithm pool. A first location may use a first set of algorithms that are selected for the algorithm pool based on features of the first location. A second location may use a second set of algorithms that are selected for the algorithm pool based on features of the second location. Features may include connectivity, security, speed, among other features. One location may require low security, another high security. One location may have low transmission bandwidth limits, another may be unlimited. Different regions or countries may have different requirements for transmitting personal information. The selection of algorithms may be based on the type of data being transmitted. Certain data may have higher security requirements than other data. Users may also have different preferences regarding security versus speed and computational requirements. The selection of algorithms provides that the system may dynamically adjust the encoding so that the levels of security, bandwidth, and computational complexity are configured for the scenario at hand. The algorithms and the algorithm pool may be stored in the memory of the device 122. The memory 209 may be a volatile memory or a non-volatile memory. The memory 209 may include one or more of a read only memory (ROM), random access memory (RAM), a flash memory, an electronic erasable program read only memory (EEPROM), or other type of memory. The memory 209 may be removable from the mobile device 122, such as a secure digital (SD) memory card. The memory may contain a locally stored geographic database or link node routing graph. The locally stored geographic database may be a copy of the geographic database 123 or may include a smaller piece. The locally stored geographic database may use the same formatting and scheme as the geographic database.

At act A230, map data 410 is collected by the navigation device 122. The map data 410 may be collecting using one or more sensors or applications. The one or more sensors may include, for example, cameras, LIDAR, RADAR, GPS, positional circuitry, or other sensors. The map data 410 may be input by a user into the navigation device 122. Map data 410 may be sensitive data that requires special attention when being used or shared. Map data may include location data. Location data is any data with an implicit or explicit geographic or geospatial reference, including any data derived from GPS, GIS, cell-tower or other radio signal based triangulation, assisted-GPS positioning devices, systems and processes, geo-tagged images, video, audio and text documents, satellite and aerial imagery, computerized, digitized and paper maps, IP address location, public documents, public or private databases, video, audio, text and image files, location-based applications. Location data is any form of information that has a geographic position associated with it.

At act A240, the map data 410 is divided into a plurality of chunks. The controller 201 is configured to separate the map data 410 into different chunks. The chunks may be equally sized or not. In an embodiment, each chunk contains the same number of bytes. In another embodiment, the chunks are divided along logical break points, for example, by words, paragraphs, image frames, etc. Each chunk may include a header that specifies where in relation to the other chunks the chunk falls. The header may also include an identifier for the random algorithm by which the chunk is encoded at act A250 described below. The controller 201 may include a general processor, digital signal processor, an application specific integrated circuit (ASIC), field programmable gate array (FPGA), analog circuit, digital circuit, combinations thereof, or other now known or later developed processor. The processor 800 may be a single device or combinations of devices, such as associated with a network, distributed processing, or cloud computing.

At act A250, each of the chunks is encoded with a random algorithm from the algorithm pool. The chunks are also encoded with a number or id, e.g., algorithm identifier, that specifies the algorithm used to encode the chunk. For example, each chunk may include a header that is appended onto the encoded data that specifies the identifier of the algorithm that is used to encode the data. Encoding transforms the data in the chunk. The encoded data is different than the original data in the chunk and may only be accessed or understood by decoding using the same algorithm used to encode the chunk.

At act A260, the encoded map data 430 is transmitted to the mapping system 121. The communications interface 205 may transmit the encoded map data 430 to the mapping system 121 for analysis or storage. The encoded map data 430 may be transmitted to another device or a remote location for use or storage. The encoded map data 430 may be stored locally on the device for later transmission or use by the device. The communications interface 205 may include any operable connection. An operable connection may be one in which signals, physical communications, and/or logical communications may be sent and/or received. An operable connection may include a physical interface, an electrical interface, and/or a data interface. The communication interface 205 provides for wireless and/or wired communications in any now known or later developed format. The communication interface 205 may include a receiver/transmitter for digital radio signals or other broadcast mediums.

Figure 7:
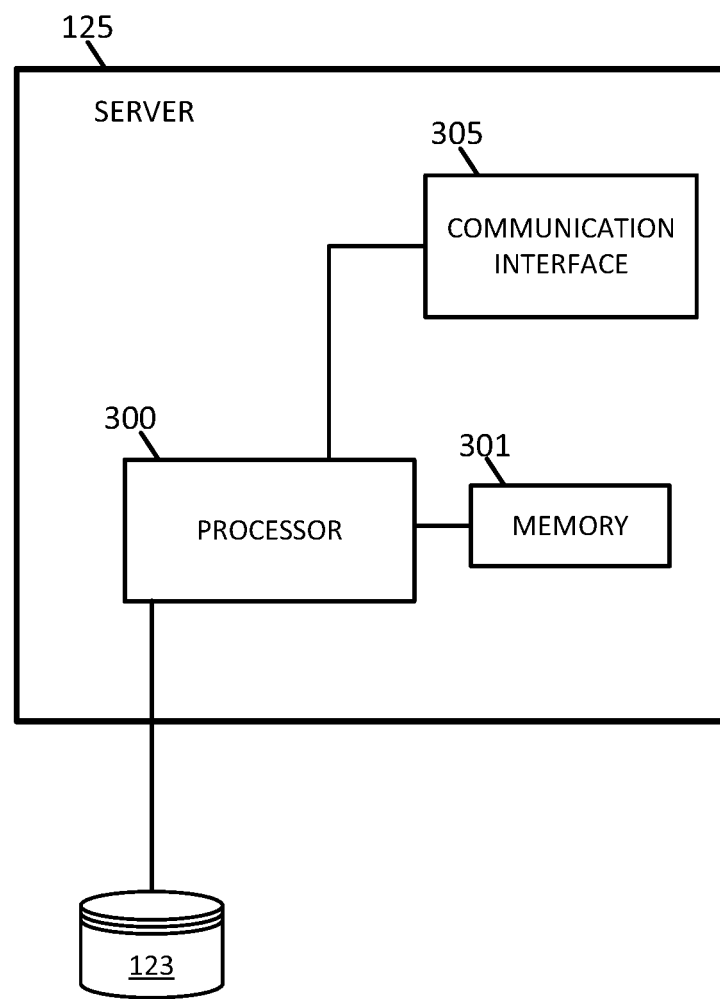
FIG. 7 depicts an example server for encoding and transmitting map data.

FIG. 7 illustrates an example server 125 of the system of FIG. 2. The server 125 includes a processor 300 that is connected to a communications interface 305 and a memory 301. The processor 300 is also connected to the geographic database 123. The communications interface 305 is configured to transmit map data to a navigation device 122 and to receive map data from a navigation device 122. The memory is configured to store the map data 122 and different algorithms for use in an algorithm pool. The processor 301 is configured to generate an algorithm pool and encode or decode the map data.

The processor 301 is configured to provide an algorithm pool to a navigation device 122 so that the navigation device 122 can encode and securely transmit map data to the server 125.

The processor 300 may include a general processor, digital signal processor, an application specific integrated circuit (ASIC), field programmable gate array (FPGA), analog circuit, digital circuit, combinations thereof, or other now known or later developed processor. The processor 300 may be a single device or combinations of devices, such as associated with a network, distributed processing, or cloud computing.

The communications interface 305 may include any operable connection. An operable connection may be one in which signals, physical communications, and/or logical communications may be sent and/or received. An operable connection may include a physical interface, an electrical interface, and/or a data interface. The communications interface 305 provides for wireless and/or wired communications in any now known or later developed format. The communications interface 305 may include a receiver/transmitter for digital radio signals or broadcast mediums. The memory 303 may include one or more of a read only memory (ROM), random access memory (RAM), a flash memory, an electronic erasable program read only memory (EEPROM), or other type of memory.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in the specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in the application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a GPS receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may be a non-transitory medium such as a ROM, RAM, flash memory, etc. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following embodiments and equivalents thereto are claimed as the invention.

The following embodiments are disclosed. Embodiment 1: a method for encoding map data, the method comprising: syncing, by a processor, an algorithm pool between a mapping server and a navigation device; wherein the algorithm pool comprises a plurality of different algorithms; dividing, by the processor, the map data into a plurality of chunks of data; encoding, by the processor, each chunk of data of the plurality of chunks with a random algorithm from the algorithm pool; and transmitting the encoded chunks of data to the navigation device.

Embodiment 2: the method of embodiment 1, wherein encoding further comprises: appending, by the processor, an algorithm identifier to each chunk that identifies the random algorithm used to encode the chunk.

Embodiment 3: the method of embodiment 1, wherein a number of the plurality of chunks is equal to a number of different algorithms in the algorithm pool.

Embodiment 4: the method of embodiment 1, further comprising: selecting, by the processor, the algorithm pool from a plurality of algorithm pools as a function of an attribute of the navigation device.

Embodiment 5: the method of embodiment 4, wherein the attribute is low computational ability; wherein the algorithm pool is selected to comprise a plurality of algorithms with low computational requirements.

Embodiment 6: the method of embodiment 4, wherein the attribute is low bandwidth; wherein the algorithm pool is selected to comprise a plurality of algorithms that require low bandwidth.

Embodiment 7: the method of embodiment 1, wherein syncing comprises: transmitting the plurality of different algorithms and identifiers for the plurality of different algorithms to the navigation device.

Embodiment 8: the method of embodiment 1, wherein the plurality of algorithms comprises at least one of ASCII, Unicode, URL Encoding, Base64, Polyalphabetic Substitution Ciphers, Morse code, or Baudot code.

Embodiment 9: A method for encoding map data, the method comprising: determining, by a navigation device, a location of the navigation device; syncing, by the navigation device, an algorithm pool with a mapping server, wherein the algorithm pool comprises a plurality of different algorithms; collecting, by the navigation device, map data; dividing, by the navigation device, the map data into a plurality of chunks of data; encoding, by the navigation device, each chunk of data of the plurality of chunks with a random algorithm from the algorithm pool; and transmitting, by the navigation device, the encoded map data to the mapping server.

Embodiment 10: the method of embodiment 9, wherein encoding further comprises: appending, by the processor, an algorithm identifier to each chunk that identifies the random algorithm used to encode the chunk.

Embodiment 11: the method of embodiment 9, wherein determining comprises: determining the location using a GPS sensor.

Embodiment 12: the method of embodiment 9, wherein the map data contains sensitive personal data.

Embodiment 13: the method of embodiment 9, wherein the plurality of different algorithms is further selected as a function of a computational ability of the navigation device Embodiment 14: the method of embodiment 9, wherein the plurality of different algorithms is further selected as a function of an available bandwidth of the navigation device.

Embodiment 15: the method of embodiment 9, wherein syncing comprises: receiving the plurality of different algorithms and identifiers for the plurality of different algorithms from the mapping server.

Embodiment 16: the method of embodiment 9, wherein the plurality of different algorithms comprises at least one of ASCII, Unicode, URL Encoding, Base64, Polyalphabetic Substitution Ciphers, Morse code, of Baudot code.

Embodiment 17: the method of embodiment 9, wherein the mapping server comprises another navigation device.

Embodiment 18: a system for securing map data by a navigation device, the system comprising: a sensor configured to collect map data; a memory configured to store an algorithm pool comprising a plurality of different algorithms; and a processor configured to divide the map data into a plurality of chunks and encode each chunk of the plurality of chunks using a random algorithm from the algorithm pool.

Embodiment 19: the system of embodiment 18, further comprising: a transmitter configured to transmit the encoded map data to a mapping server for analysis.

Embodiment 20: the system of embodiment 18, wherein each of the plurality of chunks further comprises a header with an identifier for the random algorithm used to encode the respective chunk.

I claim:

1. A method for encoding map data, the method comprising:
selecting, by a processor, an algorithm pool from a plurality of algorithm pools as a function of an attribute of a navigation device;
syncing, by the processor, the algorithm pool between a mapping server and the navigation device; wherein the algorithm pool comprises a plurality of different algorithms;
dividing, by the processor, the map data into a plurality of chunks of data;
encoding, by the processor, each chunk of data of the plurality of chunks with an algorithm from the algorithm pool, wherein the algorithm from the algorithm pool is selected based on at least one feature of a location of the navigation device; and
transmitting the encoded chunks of data to the navigation device.

2. The method of claim 1, wherein encoding further comprises:
appending, by the processor, an algorithm identifier to each chunk that identifies the algorithm used to encode the chunk.

3. The method of claim 1, wherein a number of the plurality of chunks is equal to a number of different algorithms in the algorithm pool.

4. The method of claim 1, wherein the attribute is low computational ability; wherein the algorithm pool is selected to comprise a plurality of algorithms with low computational requirements.

5. The method of claim 1, wherein the attribute is low bandwidth; wherein the algorithm pool is selected to comprise a plurality of algorithms that require low bandwidth.

6. The method of claim 1, wherein syncing comprises:
transmitting the plurality of different algorithms and identifiers for the plurality of different algorithms to the navigation device.

7. The method of claim 1, wherein the plurality of algorithms comprises at least one of ASCII, Unicode, URL Encoding, Base64, Polyalphabetic Substitution Ciphers, Morse code, or Baudot code.

8. A method for encoding map data, the method comprising:
determining, by a navigation device, a location of the navigation device;
syncing, by the navigation device, an algorithm pool with a mapping server, wherein the algorithm pool comprises a plurality of different algorithms, wherein the plurality of different algorithms is selected as a function of a computational ability of the navigation device;
collecting, by the navigation device, map data;
dividing, by the navigation device, the map data into a plurality of chunks of data;
encoding, by the navigation device, each chunk of data of the plurality of chunks with an algorithm from the algorithm pool, wherein the algorithm from the algorithm pool is selected based on at least one feature of the location of the navigation device; and
transmitting, by the navigation device, the encoded map data to the mapping server.

9. The method of claim 8, wherein encoding further comprises:
appending, by the processor, an algorithm identifier to each chunk that identifies the algorithm used to encode the chunk.

10. The method of claim 8, wherein determining comprises:
determining the location using a global positioning system sensor.

11. The method of claim 8, wherein the map data contains sensitive personal data.

12. The method of claim 8, wherein the plurality of different algorithms is further selected as a function of an available bandwidth of the navigation device.

13. The method of claim 8, wherein syncing comprises:
receiving the plurality of different algorithms and identifiers for the plurality of different algorithms from the mapping server.

14. The method of claim 8, wherein the plurality of different algorithms comprises at least one of ASCII, Unicode, URL Encoding, Base64, Polyalphabetic Substitution Ciphers, Morse code, of Baudot code.

15. The method of claim 8, wherein the mapping server comprises another navigation device.

16. A system for securing map data by a navigation device, the system comprising:
a sensor configured to collect map data;
a memory configured to store an algorithm pool comprising a plurality of different algorithms selected as a function of a computational ability of the navigation device; and
a processor configured to divide the map data into a plurality of chunks and encode each chunk of the plurality of chunks using an algorithm from the algorithm pool, wherein the algorithm from the algorithm pool is selected based on at least one feature of a location of the navigation device.

17. The system of claim 16, further comprising:
a transmitter configured to transmit the encoded map data to a mapping server for analysis.

18. The system of claim 16, wherein each of the plurality of chunks further comprises a header with an identifier for the algorithm used to encode the respective chunk.

* * * * *